United States Patent Office 3,535,108
Patented Oct. 20, 1970

3,535,108
PROCESS FOR PRODUCING ALUMINUM
Paul Kobetz and Warren E. Becker, Baton Rouge, La., assignors to Ethyl Corporation, New York, N.Y., a corporation of Virginia
No Drawing. Continuation-in-part of application Ser. No. 653,622, July 17, 1967. This application Sept. 22, 1969, Ser. No. 860,097
Int. Cl. B22f 9/00; C22b 21/00
U.S. Cl. 75—68                 20 Claims

ABSTRACT OF THE DISCLOSURE

Aluminum is formed by exposing alkylaluminum hydride, tertiary amine and a dissociation catalyst (e.g., $TiCl_4$) to suitable temperatures for suitable time periods. Instead of forming large amounts of free olefin by-product (as happens in prior art processes) this process coproduces trialkylaluminum:

$$3R_2AlH \xrightarrow[\text{catalyst}]{\text{t-amine \&}} Al + 2R_3Al + 3/2\, H_2$$

The process can be conducted at temperatures lower than used in the prior art processes, or at elevated temperatures. Unitary operations using the above reaction for converting crude aluminum into purified aluminum are described. One such operation is:

$$\text{Crude Al} + 2R_3Al + 3/2\, H_2 \xrightarrow{\text{t-amine}} 3R_2AlH + \text{solids}$$

$$3R_2AlH \xrightarrow[\text{catalyst}]{\text{t-amine \&}} Al + 2R_3Al + 3/2\, H_2$$

which reduces to:

$$\text{Crude Al} \xrightarrow{\text{catalyst}} Al + \text{solids}$$

---

This is a continuation-in-part of our prior copending application Ser. No. 653,622, filed July 17, 1967 and now abandoned.

FIELD OF THE INVENTION

This invention relates to a thermal process for producing aluminum. More particularly, this invention relates to a process of this character which, although utilizing alkylaluminum compounds in its practice, does not require but may use high temperatures and which does not result in the liberation or evolution of appreciable quantities of hydrocarbon (e.g., olefin) by-products.

BACKGROUND

Heretofore, considerable attention has been devoted to thermal decomposition processes for producing aluminum from alkylaluminum compounds. See, for example, U.S. 2,843,474 granted July 15, 1958; Annalen der Chemie, vol. 629, Nos. 1–3, March 1960, pp. 210–221; Canadian Pat. 645,138, issued July 17, 1962; British Pat. 955,860, published Apr. 22, 1964; U.S. 3,154,407, granted Oct. 27, 1964 and U.S. 3,273,996, granted Sept. 20, 1966 (Canadian 682,947, issued Mar. 24, 1964); U.S. 3,170,-787, granted Feb. 23, 1965 (Canadian 683,037, issued Mar. 24, 1964); Japanese application 22,474/64 apparently published Oct. 10, 1964; U.S. 3,306,732, granted Feb. 28, 1967 (Canadian 742,636, issued Sept. 13, 1966); and references cited therein.

Despite the extent of these prior investigations, several fundamental shortcomings remain in the art. In the first place, thermal decomposition of alkylaluminum compounds is a strongly endothermic reaction. Even under the most favorable conditions reported in the above disclosures the lowest temperature of decomposition is reported as 145–160° C. (U.S. 3,306,732; Table 1).

Secondly, in the prior processes involving thermal decomposition of ethyl or higher alkylaluminum compounds, almost quantitative amounts of olefin are produced along with the aluminum and hydrogen. Although it has been recommended that the olefin and hydrogen be reused to prepare additional alkylaluminum compound for use in the decomposition step, the reaction of olefin, hydrogen and aluminum is generally not particularly rapid, especially where ethylene is concerned. Moreover, some of the liberated olefin tends to be hydrogenated both during the course of the thermal decomposition step itself (see, for instance, the examples of U.S. 3,154,407) and in the reaction of crude aluminum with olefin and hydrogen (see, for instance, U.S. 2,843,474).

Thirdly, unless care is exercised in practicing process technology and innovations described in connection with some of these prior thermal decomposition processes, the production of aluminum excessively contaminated with aluminum carbide is a likely prospect.

OBJECTIVES

Accordingly, an objective of this invention is to provide a novel and useful thermal process for producing aluminum. Another object is to provide a process of this character which is capable of producing aluminum at temperatures significantly below those heretofore required to thermally decompose alkylaluminum compounds. A further object is to provide a process for producing aluminum which, although utilizing alkylaluminum compounds in its practice, does not result in the liberation or evolution of appreciable quantities of hydrocarbon (e.g., olefin) by-product, whether low or high temperatures are used. Other important objects, features, advantages, and characteristics of this invention will become apparent from the ensuing description and appended claims.

THE INVENTION

In accordance with this invention aluminum is produced by subjecting a system formed from an alkylaluminum hydride (e.g., dialkylaluminum hydride), tertiary amine, and a suitable dissociation catalyst to a temperature sufficiently high and for a period of time sufficiently long to cause formation of aluminum and hydrogen but insufficient to cause an appreciable amount of hydrocarbon to be liberated. In this process, the alkylaluminum hydride is converted (probably through one or more transitory intermediates) into aluminum, hydrogen and an alkylaluminum coproduct (trialkylaluminum at least a portion of which is usually complexed with the tertiary amine).

Thus, although the present process has as its principal utility that of producing purified aluminum metal, it will be understood and appreciated that the process may be considered equally well as a process for converting alkylaluminum hydride into an alkylaluminum product (principally trialkylaluminum) while at the same time coproducing both aluminum and hydrogen.

Unlike all of the previously reported processes for producing aluminum from alkylaluminum compounds or complexes thereof, an appreciable amount of hydrocarbon (e.g., olefin) is not liberated in the present process. At most, the reaction system or the gas phase associated therewith will contain perhaps a few weight percent, based on the weight of aluminum produced, of free olefin or other free hydrocarbon derived from the alkylaluminum fed into and produced in the process. In other words, the prior processes exemplified by the disclosures cited above are understood to proceed via the equations:

$$R_3Al \rightarrow R_2AlH + \text{olefin}$$
$$R_2AlH \rightarrow Al + 3/2\, H_2 + 2\text{ olefin}$$

On the other hand, the aluminum-forming step of this invention, based on the available exeprimental evidence, may be depicted (when using dialkylaluminum hydride) as follows:

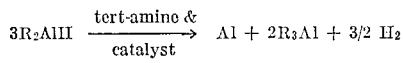

$$3R_2AlH \xrightarrow{\text{tert-amino \& catalyst}} Al + 2R_3Al + 3/2\ H_2$$

Another feature of this invention is that it does not require temperatures in the range of 180–200° C. to 300° C. required in most of the above-cited prior processes, nor for that matter temperatures ranging upwards from 145–160° C. as described in U.S. 3,306,732. However, in the present process, temperatures as high as about 260° C. may be utilized in some cases (e.g., when using short residence times) without forming appreciable amounts of free olefin. Moreover, given sufficient time some of the systems of this invention will liberate aluminum metal even at room temperature.

A further feature of this invention is that the process is capable of producing high purity aluminum, e.g., 99.5 weight percent and above.

For practical industrial application, where throughput per unit time is of importance, it is desirable pursuant to this invention to heat a system formed from the alkylaluminum hydride, tertiary amine and a small amount of the thermal dissociation catalyst to a temperature within the range of from about 80° C. to about 260° C. with the proviso that with the particular materials being utilized the temperature is high enough and the heat is applied long enough to cause formation of aluminum and hydrogen without causing an appreciable amount of hydrocarbon to be liberated.

Generally speaking, the length of time any given system of this invention is subjected to the temperature for forming aluminum and hydrogen will be inversely proportional to the temperature being used. For example, periods ranging from many hours to days are used when the process is operated at about room temperature up to about 50° C. On the other hand, at temperatures of about 220° C. to about 260° C., the exposure time will be a matter of a few minutes at most.

In most cases the reaction temperatures for most practical operation will be from about 110° C. to about 220° C. When it is desired to conduct a relatively low temperature process within this range (e.g., operate between about 110° C. and about 140° C.) the residence time for most of the above systems will be from about 5 to about 30 minutes. When operating at the upper end of this temperature range (160–220° C.) the residence times are usually from about 1 to about 10 minutes. Intermediate times are normally employed for the intermediate temperatures of this range (140–160° C.).

It will be understood and appreciated that the foregoing temperature-time relationships will vary depending upon the make up of the particular reaction system being utilized, and indeed, whatever small amount of free olefin or other liberated hydrocarbon is deemed acceptable for the purposes at hand. Thus the suitable and the optimum temperatures and residence or heating times for any given system of this invention can readily be determined in each case by a few simple experiments. In all cases, however, the temperature and time used will be sufficient to form aluminum and gaseous hydrogen but insufficient to liberate free hydrocarbon (e.g., free olefin).

When conducting this process it is preferable that the system being subjected or heated to the appropriate temperature include a trialkylaluminum, especially one which corresponds to the alkylaluminum hydride being used. This is advantageous because when forming dialkylaluminum hydride, for example, the corresponding trialkylaluminum compound is almost always present in the product and thus the resulting mixture of alkylaluminum compounds can be utilized in this process. In short, it is not necessary to effect a separation between these alkylaluminum compounds. Further, trialkylaluminum compounds which have relatively high thermal decomposition temperatures (e.g., triethylaluminum) serve as very convenient carriers of thermal energy to the aluminum-forming system. That is to say, separate portions of such trialkylaluminum compounds may be preheated to an appropriate temperature below their thermal decomposition temperature and be directly introduced or fed into the thermal decomposition zone whereby the suitable aluminum-forming temperature is maintained or produced in the zone at least in part in this manner.

In the preferred operation where the metallic aluminum is produced under the application of heat energy to the appropriate systems noted above, a variety of heating procedures may be used. For example, heat may be periodically or continuously supplied so that the appropriate dissociation temperature is continuously maintained within the reaction zone (a procedure useful in continuous operation) or the systems may be formed and then their temperature raised—either in one stage or in a plurality of incremental stages—to the appopirate dissociation temperature, as in a batch or semi-continuous type operation. If desired, the systems may be formed (except for the catalyst) and quickly brought up to the appropriate temperature at which point the thermal dissociation catalyst is introduced into the system whereby formation of metallic aluminum and evolution of gaseous hydrogen occur. Furthermore, the heat energy may be impressed directly upon the reaction systems (e.g. by means of electric heating elements heat transfer from suitable liquids of high thermal capacity and stability or the like) or at least a portion of the thermal energy may be carried into the thermal decomposition zone by preheating one or more of the ingredients being fed into the zone notably the trialkylaluminum feed as explained above. It is also possible to bring the reaction systems in contact with suitably heated aluminum surfaces (e.g. bars pellets or the like) whereby the aluminum which is produced plates out on or otherwise adheres to such surfaces. When utilizing the process to prepare aluminum coatings on other suitable substrates (e.g. metals ceramics etc.) the substrates may be preheated to the appropriate temperature and promptly brought into contact with the reaction system or the substrates may be introduced into the reaction system and then heated while in contact therewith by such means as induction heating or the like. These and other suitable methods for the application of heat for effecting the above process will now be clearly evident to those skilled in the art.

Additional advantageous features characterize this invention. For example, the thermal decomposition operations discussed above tend to be quite rapid especially when using an optimum temperature for the system at hand. This renders the process very useful for industrial applications insamuch as long thermal decomposition periods can be avoided. Another feature is that the above thermal decomposition operations do not require the application of reduced pressure, although reduced pressures may be used if desired in order to facilitate recovery of the gaseous hydrogen and excess volatile tertiary amines. In most cases, however, the aluminum will be produced pursuant to this invention under ambient pressure conditions. Though there is no particular advantage in utilizing elevated pressures, the process is entirely operative under such conditions especially where the superatmospheric pressures are not unduly excessive (e.g., are not above about 5000 p.s.i.).

To facilitate the recovery of the aluminum produced in accordance with this invention, it is preferable to conduct a liquid phase thermal decomposition operation. In this way, the metallic aluminum product appears as a solid phase which can be easily isolated or recovered from the liquid reaction system by such means as filtration, centrifugation, and like separation techniques. Thus, in accordance with this preferred liquid phase embodiment, the process comprises forming a liquid phase system from alkylaluminum hydride, preferably dialkylaluminum hydride, and tertiary amine and subjecting that system in the presence of a small amount of the appropriate catalyst to a temperature sufficiently high and for a period of time sufficiently long to cause the formation of aluminum and hydrogen but insufficient to cause the liberation of an appreciable amount of hydrocarbon (e.g., olefin). As noted above, it is desirable to also include trialkylaluminum in the liquid phase system, especially a trialkylaluminum compound corresponding to the alkylaluminum hydride being utilized. Many trialkylaluminum compounds assist in maintaining or producing these desirable liquid phase systems.

Any of a variety of alkylaluminum hydrides can be successfully used in the process. Exemplary materials include dialkylaluminum hydrides such as dimethylaluminum hydride, dipropylaluminum hydride, diisopropylaluminum hydride, diisobutylaluminum hydride, di-2-methylpentylaluminum hydride, dioctylaluminum hydride, didodecylaluminum hydride, dicetylaluminum hydride, and other similar compounds. Other closely related alkylaluminum hydrides which may be successfully used in this process include alkylaluminum dihydrides (particularly when complexed with tertiary amine which confers stability to the molecule) and alkylaluminum sesquihydrides ($R_3Al_2H_3$). Examples of these alkylaluminum hydrides are methylaluminum dihydride complexed with trimethyl amine, ethylaluminum dihydride complexed with triethyl amine, methylaluminum sesquihydride, ethylaluminum sesquihydride, and the like. From the standpoint of availability and ease of synthesis, dialkylaluminum hydrides, especially those in which the alkyl groups are alike and each contains from 2 to about 8 carbon atoms prove to be most useful and are preferred. Of these compounds, dihexylaluminum hydride is a typical example. However, of all of the suitable dialkylaluminum hydrides, diethylaluminum hydride is most especially preferred because it has a very high aluminum content (second only to dimethylaluminum hydride and methylethylaluminum hydride, both of which are more difficult and costly to prepare). Moreover, diethylaluminum hydride is an ethylene-based compound (whether made directly from ethylene, aluminum and hydrogen or indirectly from aluminum, hydrogen and triethylaluminum, the latter being most readily prepared according to present-day technology from ethylene). It is of course well recognized that ethylene is widely available at relatively low cost.

With reference to diethylaluminum hydride as a particularly preferred material for use in the present process, it is worth noting that some of the above-cited processes are indicated as being applicable only to alkylaluminum compounds in which the alkyl groups are butyl or higher. Moreover, a cross-reading of Examples 1 and 2 of U.S. 3,170,787 strongly indicates that prior thermal decomposition processes are more suitable for isobutylaluminum compounds than ethylaluminum compounds because the latter, when utilized in accordance with the prior teachings, tend to form aluminum contaminated with considerable amounts of aluminum carbide. Self-evidently, this undesirable aluminum carbide impurity results from homolytic cleavage of carbon-to-aluminum bonds, a type of cleavage which apparently does not occur when the aluminum is released in this process. Thus, pursuant to the present invention, ethylaluminum hydrides and especially diethylaluminum hydride can be utilized with great advantage in preparing high purity aluminum.

The trialkylaluminum compounds which are preferably used in conjunction with the above-described alkylaluminum hydrides likewise may vary to a considerable extent. Thus, effective use may be made of such compounds as trimethylaluminum, tripropylaluminum, triisobutylaluminum, trihexylaluminum, tridecylaluminum, trioctadecylaluminum, and the like. As noted above, it is generally advantageous, when utilizing a combination of alkylaluminum hydride and trialkylaluminum, that all of the alkyl groups be the same and preferably each contain from 2 to about 8 carbon atoms. Systems wherein the alkylaluminum content is composed of diethylaluminum hydride and triethylaluminum are most especially preferred.

When utilizing the desirable combination of dialkylaluminum hydride and trialkylaluminum, the relative proportions thereof can vary within relatively wide limits. For example, weight ratios of $R_2AlH:R_3Al$ ranging upwards from 1:15 can be used. It is most practical to use mixtures which contain at least about 50 percent by weight of the dialkylaluminum hydride, the balance being the trialkylaluminum compound. The same general considerations apply when using systems comprising trialkylaluminum and alkylaluminum hydrides other than dialkylaluminum hydride or mixtures of all of these.

The tertiary amines, which are essential for the practice of the present process, are likewise susceptible to considerable variation. Generally speaking, members of three typical classes will be found most suitable—namely, (a) amines having the formula $R_3N$ wherein the R groups are the same or different, and are alkyl, cycloalkyl, aryl, or aralkyl groups;
(b) heterocyclic mononuclear tertiary mono amines; and
(c) amines having the formula

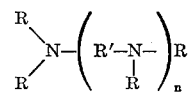

wherein the R groups can be the same or different and are alkyl, cycloalkyl, aryl, or aralkyl groups; and R' is an alkylene or arylene group and $n$ is an integer from 1 to 6.

Thus, the suitable tertiary amines are typified by such compounds as trimethyl amine, triethyl amine, tributyl amine, N,N-dimethyl aniline, pyridine, and N,N,N',N'-tetramethylethylene diamine. Other compounds are exemplified by butyldimethyl amine, trihexyl amine, tridecyl amine, lauryl dimethyl amine, tricyclohexyl amine, tri-(methylcyclohexyl) amines, triphenyl amine, tritolyl amines, trixylyl amines, tri-(p-tertiary-butylphenyl) amine, tribenzyl amine, tri-(2-phenylethyl)amine, ethyldicyclohexyl amine, N,N-diethylaniline, alpha-picoline, beta-picoline, gamma-picoline, N-methyl piperidine, N,N,N',N'-tetraethylethylene diamine, N,N,N',N'-tetraisopropyl-p-phenylene diamine, and the like. Mixtures of different tertiary amines may be used, if desired. The suitability of any given tertiary amine can easily be determined by the simple expedient of running a few experiments.

The foregoing tertiary amines tend to form complexes of alkylaluminum compounds. It will thus be understood and appreciated that the tertiary amine may be introduced into the heating zone (i.e., thermal dissociation zone) either in whole or in part as a complex with the alkylaluminum hydride or the trialkylaluminum (when utilized), or with both.

The amount of tertiary amine utilized in this process can vary within relatively wide limits. For example, the amine may be present in considerable excess relative to the total quantity of alkylaluminum compound(s) being used. Conversely, the alkylaluminum compound(s) being utilized can be present in considerable excess relative to the amount of tertiary amine beign used. Generally speaking it is convenient to employ mole ratios of alkylaluminum compound(s):tertiary amine ranging from about 20:1 to 1:5. When an excess of tertiary amine (liquid at the reaction temperature) is utilized it serves as a convenient reaction diluent.

Dissociation catalysts, the use of which is an essential feature of this invention, fall in various categories. One general grouping of compounds, members of which have been found particularly suitable, may be represented by the formula $MX_4$ wherein the X groups can be the same or different and are chlorine, bromine, iodine or alkoxy, and M is titanium, zirconium, hafnium or vanadium. Thus the thermal dissociation catalysts are typified by titanium tetrachloride, titanium alkoxides (especially those in which the alkoxy groups each contain up to about 10 or 20 carbon atoms), vanadium tetrachloride, and the like. Similarly efficacious catalysts may reside within classes of compounds exemplifier by the tetrahalides of zirconium and hafnium wherein the halogen is chlorine, bromine or iodine; mono-, di- and tri-alkoxy metallic halides in which the metal is titanium, zirconium, hafnium or vanadium, and the halogen is chlorine, bromine or iodine; zinc dihalides such as zinc dichloride and zinc dibromide; and the like. It is entirely possible that still other suitable catalysts may be found on running appropriate screening tests. It will thus be appreciated that at present it is difficult, if not impossible, to exemplify every compound or complex which serves to facilitate the conversion of alkylaluminum hydride in the presence of tertiary amine into aluminum, hydrogen, and alkylaluminum coproduct without liberating appreciable quantities of hydrocarbons (e.g., free olefin) under the conditions of the process of this invention. As noted above, various compounds do function in this manner and others may be found by screening procedures involving techiques such as described in Example X below. Based on available experimental results, the most preferred catalysts are titanium tertachloride and titanium tetraalkoxides in which each alkoxy group contains 1 to 16 carbon atoms.

The thermal dissociation catalysts are preferably introduced into the thermal dissociation zone in relatively small quantities—e.g., from 1 part per 10,000 parts of aluminum produced up to 1 part per 100 parts of aluminum produced, these parts being on a weight basis. Preferably, the quantity of catalyst used will be on the low side—i.e., one will normally use not much more than the smallest quantity of catalyst which will produce the desired rate-enhancing result under the particular conditions and with the particular system being used. Whether the above materials exhibit their catalytic effects while existing in their original chemical state or whether they become chemically transformed before or during the course of their catalytic activity is not known. In any event, it has been verified experimentally that the introduction into the reaction zone of such catalytic materials gives rise to the accelerated liberaion of aluminum and hydrogen without the formation of excessive quantities of free olefin or other free hydrocarbons.

If desired, auxiliary diluents or reaction solvents may be employed in the present process. For this purpose inert hydrocarbons which are liquid at the reaction temperature (and thus have boiling points in excess of the reaction temperature) are particularly convenient. Exemplary of the hydrocarbon media which may be employed are the paraffinic, cycloparaffinic, and aromatic hydrocarbons such as petroleum naphthas, paraffin oils, alkyl benzenes, alkyl naphthalenes, petroleum ether, gasoline or kerosene (so long as an appreciable amount of olefinic unsaturation is not present therein), biphenyl and alkylated derivatives thereof, and the like. In addition to or in lieu of such hydorcarbon diluents, use may be made of silicon oils, fluorocarbons or other diluents which do not interfere with the desired reaction or cause contamination of the aluminum produced. In practicing this process the liquid phase may include alkyl alkoxy aluminum compounds such as diethyl ethoxy aluminum and the like, or ethers such as diethyl ether, dibutyl ether and diphenyl ether. Generally speaking, it is preferable to conduct the process of this invention in the absence of such auixilary media inasmuch as essentially liquid phase systems can readily be produced by utilizing, in appropriate relative proportions, suitable alkylaluminum component(s) and tertiary amines.

The various materials to be present in the aluminum-forming reaction system may be fed into the reaction zone in many different ways. For example, the alkylaluminum hydride, tertiary amine, dissociation catalyst, trialkylaluminum (if used) and auxiliary reaction diluent (if used) may be fed separately or in any appropriate subcombination, either concurrently or in any suitable sequence. When the reaction zone is continuously maintained at a highly elevated temperature (e.g., 220–260° C.) it is desirable to insure that the alkylaluminum component(s) are not exposed to such temperatures in the absence of the tertiary amine for any significant period of time inasmuch as such exposure tends to cause homolytic cleavage of the carbon-to-aluminum bonds, liberation of free hydrocarbon (e.g., olefin) and contamination of the metallic aluminum of carboneous impurities (notably aluminum carbide). Thus, where the reaction zone is continuously maintained at these elevated temperatures the alkylaluminum hydride and tertiary amine are preferably concurrently fed into the zone either as a preformed mixture (in which at least some alkylaluminum-tertiary amine complex will normally exist) or as simultaneously introduced separate feeds. Trialkylaluminum will usually and preferably accompany the alkylaluminum hydride.

In conducting this process one may resort to seeding of finely divided aluminum powder into the aluminum producing system, if desired. The seeding of the system with aluminum powder tends to increase the average particle size of the aluminum formed via thermal dissociation. In this connection, the seed aluminum powder may be added directly to the reactor or it may be first mixed wih alkylaluminum component(s) and the resulting suspension introduced into the reactor. When charging the feed directly to the reactor recourse may be had to preheating the powder (e.g., in a suitable oven) to an appropriate elevated temperature so that the particulate aluminum as fed into the reactor is already at a suitable reaction-promoting temperature.

The aluminum produced in the present process is readily separated from the reaction system by various common techniques. For example, when the aluminum is formed in an otherwise essentially liquid phase system, the particulate aluminum product can be isolated by means of filters, centrifuges or like equipment. It is desirable to wash the isolated aluminum product with an appropriate inert liquid which will remove residual quantities of alkylaluminum materials and the like. For this purpose low boiling paraffinic or aromatic hydrocarbons such as pentane, hexane, heptane, benzene and the like are particularly suitable. These low boiling materials are not only inert washing agents but can be readily removed from the purified aluminum powder by comomn drying techniques. In short, suitably volatile inert hydrocarbons will not leave undesirable residues upon the surface of the aluminum product. After the washing operation, the aluminum may be heated to an elevated temperature (e.g., 150° C.) under a suitable vacuum (e.g., 10 to 100 mm. Hg) to remove any traces of aluminum alkyl and/or adsorbed hydrogen.

Particularly preferred embodiments of this invention involve the use of the above catalytic thermal dissociation operation as a part of a comprehensive process for the chemical refining of crude aluminum. One such embodiment involves at least the following steps:

(1) Converting crude metallic aluminum into a dialkylaluminum hydride-containing liquid phase and a residual solids phase;

(2) Effecting separation between these phases;

(3) Subjecting the separated liquid phase together with tertiary amine and a small amount of the thermal dissociation catalyst to a temperature sufficiently high and for a period of time sufficiently long to cause the formation of aluminum and hydrogen but insufficient to cause the liberation of an appreciable amount of hydrocarbon; and (4) Recovering the aluminum formed in (3).

Various types of crude metallic aluminum are suitable for use in practicing the above-noted first step of the unitary operation. Thus the crude aluminum may be in the form of aluminum alloys, aluminum scrap, aluminum dross, reaction products obtained by melting together aluminum oxide-containing material and carbonaceous material (e.g., see U.S. Pats. 2,829,961 and 2,974,032) or the like provided the aluminum-bearing material contains at least some metallic aluminum which is not held in the tightly bound form of an intermetallic compound. Aluminum-silicon alloys are especially preferred as materials to be refined in this process. Aluminum-silicon alloys can readily be produced at low cost by various electrothermic reduction processes (e.g., see British Pat. 1,073,025) and thereby serve as an economical source for purified aluminum metal. Moreover by using such alloys the residual solids formed in the present process will comprise metallic silicon (usually but not necessarily associated with other common impurities such as iron, titanium and the like). Such residual solids, which can be readily recovered, are of considerable utility in the chemical and allied arts, for example, in steel making processes.

The crude aluminum is preferably employed in subdivided or particulate form although effective use may be made of turnings, chips flakes, ribbons, and the like.

In practicing the above-noted first step there are two general methods for converting the crude metallic aluminum into the dialkylaluminum hydride-containing liquid phase. One such method involves reacting the aluminum content with appropriate quantities of an alpha-olefin (e.g., ethylene, propylene, isobutylene, etc.) or internal olefin and hydrogen in the presence of an alkylaluminum catalyst (e.g., triethylaluminum). In this way it is possible to convert this aluminum content into a product which in most cases comprises the corresponding dialkylaluminum hydride and trialkylaluminum compounds. As is well known, it is desirable to suitably activate the aluminum so as to reduce the induction and reaction times. These reactions are generally carried out at somewhat elevated temperatures and pressures. For further details relative to this type of operation, reference may be had, for example, to British Pat. 1,044,735 and U.S. Pats. 2,787,626; 2,886,581; 2,900,402; 3,000,919; 3,016,396; 3,032,574; 3,050,540; 3,050,541; 3,207,773; 3,207,774; 3,381,024 and 3,393,217.

The other, and decidedly preferred, method for converting the crude metallic aluminum into the dialkylaluminum hydride-containing liquid phase involves reacting the crude aluminum with appropriate quantities of trialkylaluminum and hydrogen. This reaction proceeds very smoothly and under proper conditions, quite rapidly, whereby dialkylaluminum hydride can be formed in good yield. Moreover, the use of this type of process makes it possible to recycle or reutilize the trialkylaluminum coproduct which is formed in the aluminum-producing step.

Therefore, a preferred embodiment of this invention involves converting the crude aluminum into an alkylaluminum hydride-containing liquid phase and residual solids by reacting the aluminum with trialkyl aluminum and hydrogen under apropriate reaction conditions. Such conditions preferably include use of subdivided crude aluminum alloy, activation of the aluminum by common techniques, and utilization of suitable elevated temperature and pressure conditions. For further details concerning these reaction conditions reference may be had, for example, to British Pat. 1,044,735 and U.S. Pats. 2,885,314; 3,050,540; 3,050,541; 3,207,770; 3,207,772; 3,382,269 and 3,393,217.

The above-noted first step may be modified, if desired, so as to produce other suitable alkylaluminum hydride-containing liquid phases. Thus, although it is preferable that the liquid phase contain a significant proportion of dialkylaluminum hydride, this liquid phase may contain a significant proportion of dialkylaluminum hydride, this liquid phase may contain in addition to or in lieu thereof other alkylaluminum hydrides such as alkylaluminum sesquihydrides. Moreover, the reaction among the crude aluminum, trialkylaluminum and hydrogen may be effected in admixture with a tertiary amine, such as those described above. In this case, the alkylaluminum hydride product(s) (and the trialkylaluminum almost always co-present) will tend to exist in the form of alkylaluminum-tertiary amine complexes.

Once the above alkylaluminum hydride-containing liquid phase and the residual solids phase have been formed it is a very simple matter to effect a separation therebetween. Filtration, centrifugation and the like will most commonly be used. Thereupon the separated liquid phase is subjected to the thermal decomposition process as described above so that high purity aluminum, hydrogen and trialkylaluminum are formed. The reaction system will of course also contain the tertiary amine, at least a portion of which will usually be complexed with the trialkylaluminum coproduct. Thereupon the aluminum is readily recovered by such techniques as filtration or centrifugation.

The separations involved in the above-described unitary process are facile in that they generally involve separating solids from liquid phases.

An especially advantageous feature of this process is that it is susceptible to re-utilization or recycle of the trialkylaluminum coproduct, the gaseous hydrogen and the tertiary amine which remain after separation and recovery of the aluminum product. Naturally it is possible to reuse less than all of the tertiary amine, trialkylaluminum coproduct and gaseous hydrogen remaining in or released from the reaction system after removing therefrom the aluminum product. However, a feature of this process is that each of these can be reused in forming additional alkylaluminum hydride liquid phase for use in the overall process. Thus in essence a particularly preferred embodiment of this invention involves operation via the following sequence of reactions:

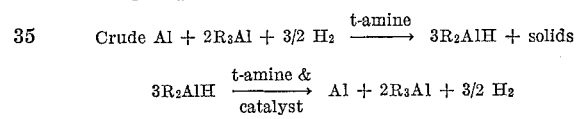

Inasmuch as the tertiary amine, the trialkylaluminum coproduct and the hydrogen can be reused the foregoing equations reduce to the following:

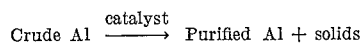

It will be seen therefore that this invention now makes possible an exceptionally efficient process for producing aluminum, a process which comprises the following steps:

(1) Forming in a reaction zone a dialkylauminum hydride-containing liquid reaction product from crude metallic aluminum, trialkylaluminum, hydrogen and tertiary amine, said aluminum initially being associated with one or more solid impurities;

(2) Effecting separation between the resulting solids and the liquid reaction product;

(3) Heating the liquid reaction product and a small amount of a thermal dissociation catalyst in a heating zone to a temperature high enough and for a period of time long enough for aluminum and hydrogen to be formed without liberating appreciable free hydrocarbon whereby trialkylaluminum and tertiary amine exist in the heating zone;

(4) Recovering aluminum formed in (3); and (5) Supplying trialkylaluminum, hydrogen and tertiary amine recovered from the heating zone to the reaction zone for producing more of the liquid reaction product by interaction with additional crude metallic aluminum.

Because this process involves use of, in effect, a circulating inventory of the trialkylaluminum and tertiary amine as well as reutilization of the hydrogen in step (1) above, this particularly preferred embodiment is well suited for operation on a continuous basis. Except for make-up quantities of trialkylaluminum, hydrogen and/or tertiary amine, this particular unitary operation in essence uses alkylaluminum compounds as carriers for conversion of crude aluminum into purified aluminum.

It will be understood and appreciated that although the above unitary operations have been described with reference to "crude aluminum," the process is applicable and extends to the use of commercially-produced aluminum (e.g., aluminum of purities as high as about 99.9 percent) as a raw material for conversion into ultra high purity aluminum (e.g., 99.99 percent purity or above). Thus the "crude aluminum" may include such materials as Hall-cell aluminum, and the like.

When utilizing aluminum-silicon alloys as a source of aluminum for use in the above comprehensive processes, it is not always necessary (although it is preferable) to introduce a preformed thermal dissociation catalyst into the heating zone in order to produce the purified aluminum metal. Without desiring to be bound by theoretical considerations, it appears that one or more of the impurity metals initially present in the aluminum-silicon alloy (perhaps titanium, vanadium, or the like) tend to form a thermal dissociation catalyst in situ, a small proportion of which appears to be carried into the heating zone along with the alkylaluminum hydride-containing stream. Therefore by judicious selection of an appropriate aluminum-silicon alloy in the light of a few pilot experiments it may be found entirely feasible to conduct the heating operation without introducing into the system one of the thermal dissociation catalysts described above. However, for most practical operation it is preferable to utilize such thermal dissociation catalysts in any thermal decomposition operation conducted pursuant to this invention inasmuch as these added catalysts insure that the aluminum, gaseous hydrogen and trialkylaluminum coproduct will be produced very rapidly without appreciable liberation of free hydrocarbon (e.g., olefin).

With reference to the above preferred embodiments wherein the "crude aluminum" is reacted with trialkylaluminum and hydrogen to form the alkylaluminum hydride-containing liquid phase, two additional points are worthy of note. The first is the discovery that the tertiary amine may be present in this hydroalumination reaction; its presence does not prevent the desired reaction. This makes it possible to reutilize or recycle all of the effluent from the heating zone (with the exception of course of the desired aluminum product).

The second point is that residues from the thermal dissociation catalysts which tend to be carried from the heating zone to the hydroalumination reaction zone along with the recycled trialkylaluminum product and/or tertiary amine will not interfere with this particular type of hydroalumination reaction. Indeed some of these catalyst residues may actually serve as catalysts for the reaction among the crude aluminum, trialkylaluminum and hydrogen to form the alkylaluminum hydride.

The aluminum when produced in particulate form (i.e., when it is an aluminum powder or the like) may, if desired, be converted into various other forms. For example, the particulate product may be pigged, rolled, or sintered thereby providing other commercially useful forms of aluminum.

The practice and advantages of this invention will become still further apparent from a consideration of the following examples. It is to be understood and appreciated, however, that these examples are presented solely for the purposes of illustration and are not intended to unduly limit the scope of this invention.

EXAMPLE I

A solution containing 25 ml. of tributyl amine, 25 ml. of an equimolar mixture of triethylaluminum and diethylaluminum hydride, and approximately 0.02 ml. of titanium tetraisopropoxide was heated to 160° C. in an oil bath. Gaseous hydrogen was evolved and aluminum metal precipitated from this mixture. The total reaction period was approximately 5 minutes.

EXAMPLE II

A run as in Example I was made which differed only in that 0.001 ml. of titanium tetraisopropoxide was used and the solution was heated to 140° C. Approximately 1.1 grams of aluminum precipitated. During the heat up, gaseous hydrogen was evolved.

EXAMPLE III

The procedure of Example I was repeated except that 2 ml. of N,N,N',N'-tetramethylethylene diamine was substituted for the tributyl amine. At 160° C. this mixture evolved gaseous hydrogen and precipitated aluminum metal.

EXAMPLE IV

A stock solution for use in conducting a series of experiments was prepared by mixing together approximately 150 ml. of an essentially equimolar mixture of diethylaluminum hydride and triethylaluminum and 55 ml. of trimethyl amine. In conducting this operation the trimethyl amine had been precooled to a temperature of −80° C. so that its volume could be measured by means of a calibrated volumetric flask. In one run a mixture of 25 ml. of this stock solution and 0.02 ml. of titanium tetraisopropoxide was heated to 160° C. for 5 minutes. During this time gaseous hydrogen evolved and aluminum metal precipitated.

In another run 25 ml. of this stock solution and 0.02 ml. of titanium tetrachloride were mixed and heated to 160° C. for 5 minutes. During this time gaseous hydrogen was evolved and metallic aluminum precipitated.

In a third run a mixture of 25 ml. of this stock solution and 0.05 ml. of vanadium tetrachloride was heated to 160° C. for 5 minutes. During this time gaseous hydrogen was liberated and aluminum precipitated.

EXAMPLE V

In a series of five runs 20 ml. portions of an essentially equimolar mixture of triethylaluminum and diethylaluminum hydride along with 0.01 ml. of titanium tetraisopropoxide were added to 100-milliliter round bottom one-neck flasks. Various quantities of the amines shown below were added to the respective flasks:

Run 1.—N,N-dimethyl aniline: 15 ml.
Run 2.—Tripropyl amine: 20 ml.
Run 3.—Pyridine: 15 ml.
Run 4.—Triethyl amine: 10 ml.
Run 5.—Triethyl amine: 20 ml.

These five mixtures were then heated in an oil bath to 140° C. In each case within 5 minutes complete precipitation of aluminum occurred with gaseous hydrogen being evolved.

EXAMPLE VI

An essentially equimolar mixture of diethylaluminum hydride and triethylaluminum was prepared by hydroalumination of an aluminum-silicon-iron-titanium alloy with triethylaluminum and hydrogen at 110° C. and 2000 p.s.i. A solution (40 ml.) containing about 75 weight percent of this diethylaluminum hydride-triethylaluminum mixture and about 25 weight percent of trimethyl amine was heated to 70° C. and at this temperature 5 ml. of N,N,N',N'-tetramethylethylene diamine and 0.0005 ml. of titanium tetraisopropoxide were added. Within 3 minutes at 70° C. decomposition had occurred as evidenced by the formation of aluminum powder and evolution of gaseous hydrogen. In this reaction 1.1 grams of aluminum, an essentially quantitative yield, was obtained.

In a similar run an additional 40 ml. portion of the above solution containing about 75 weight percent of the above diethylaluminum hydride-triethylaluminum mixture and about 25 weight percent of trimethyl amine was heated to 70° C. While at this temperature approximately 0.5 ml. of N,N,N',N'-tetramethylethylene diamine and 0.0005 ml. of titanium tetraisopropoxide were added. Within 10 minutes the decomposition had occurred (aluminum was formed and hydrogen was evolved). Once again, an essentially quantitative yield (1.1 grams) of aluminum was recovered.

EXAMPLE VII

A solution was prepared from 25 ml. of a commercially available, essentially equimolar mixture of diethylaluminum hydride and triethylaluminum, 25 ml. of tributyl amine and 0.0005 ml. of titanium tetraisopropoxide. This solution was heated to 120° C. and slow decomposition to metallic aluminum and gaseous hydrogen occurred. While maintaining the system at 120° C., there was introduced therein 1 gram of triethylene diamine:

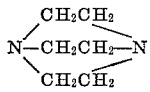

Complete decomposition to aluminum and hydrogen gas occurred immediately and from this system an essentially quantitative yield of aluminum was recovered. During the course of this decomposition hydrogen was essentially the only gaseous material liberated.

This procedure was then repeated in the same fashion except that after reaching the temperature of 120° C. 2 ml. of N,N,N',N'-tetramethylethylene diamine was introduced into the solution in lieu of the triethylene diamine. Metallic aluminum was formed and hydrogen was evolved at a fast rate under these conditions.

EXAMPLE VIII

To a solution formed from 25 ml. of an essentially equimolar mixture of diethylaluminum hydride and triethylaluminum, and 0.03 ml. of titanium tetraisopropoxide was added 25 ml. of tributyl amine and the resulting system was heated to a temperature in the range of 130–144° C. for 40 minutes. During the course of this heating, formation of aluminum and evolution of hydrogen commenced almost immediately and after the 40 minute period, 1.2 grams of aluminum were recovered. This corresponded to an essentially quantitative yield.

EXAMPLE IX

In one experiment 25 ml. of an essentially equimolar mixture of diethylaluminum hydride and triethylaluminum was heated to 170° C. for 30 minutes. No decomposition reaction occurred.

In another experiment a solution was formed from 25 ml. of an essentially equimolar mixture of diethylaluminum hydride and triethylaluminum and 25 ml. of tributyl amine. This solution was heated to 160° C. for 20 minutes. Once again no decomposition occurred.

In a third experiment a solution was formed from 25 ml. of an essentially equimolar mixture of diethylaluminum hydride and triethylaluminum, 9 ml. of trimethyl amine and 0.05 ml. of titanium tetraisopropoxide. This solution was heated to 120° C. for 15 minutes during which time hydrogen gas was evolved and aluminum powder precipitated. A total of 0.8 gram of aluminum powder was produced in this experiment.

The preceding examples clearly show that various tertiary amines and various thermal dissociation catalysts are effective in the conduct of the present process. From Examples VI and VII it is seen that the process proceeds efficiently even at low temperatures.

The fact that the present process does not result in a liberation of appreciable quantity of free hydrocarbon (i.e., olefin) was experimentally verified by a series of runs described in Examples X through XII.

EXAMPLE X

The apparatus utilized involved a thermal decomposition chamber (a 100-milliliter round bottom one-neck flask) and means for isolating and collecting a representative sample of the gaseous effluent released during the course of the thermal decomposition reaction (a gas collecting buret).

In one run 25 ml. of an equimolar mixture of triethylaluminum and diethylaluminum hydride, 25 ml. of tributyl amine and 0.02 ml. of titanium tetraisopropoxide were placed in the flask and heated to 85° C. for 15 minutes, during which time a representative sample of evolved gas was collected in the gas sampling buret. Analysis of this gaseous effluent by gas chromatography (VPC) showed 30 p.p.m. of ethylene, the balance being hydrogen. Inasmuch as 0.8 gram of metallic aluminum was produced in this same operation, the 30 p.p.m. of ethylene corresponds to only about 0.004 weight percent of ethylene based on the aluminum produced. A portion of this aluminum product was analyzed for aluminum carbide content and was found to contain only 0.006 weight percent of this impurity which indicates that the aluminum produced had a purity of over 99.99 percent.

EXAMPLE XI

The procedure of Example X was repeated with the exception that the titanium tetraisopropoxide was introduced into the alkyl-aluminum-tributyl amine system when the latter had been heated up to a temperature of 185° C. Upon introduction of the titanium tetraisopropoxide, gas evolution and precipitation of aluminum occurred virtually instantaneously. The gas evolved from the thermal decomposition itself was found to contain 434 p.p.m. of ethylene, the balance being gaseous hydrogen. In this run, 0.75 gram of metallic aluminum was produced and thus the foregoing quantity of ethylene corresponds to about 0.06 percent based on the weight of the aluminum product. Analysis of the aluminum product showed it to contain approximately 0.1 percent by weight of aluminum carbide. Consequently in this experiment aluminum of a purity of about 99.9 percent was achieved.

EXAMPLE XII

The procedure of Example X was repeated in the same way except that the titanium tetraisopropoxide catalyst was introduced when the reaction mixture had been heated up to 220° C. Once again the evolution of gas and precipitation of aluminum occurred virtually instantaneously. The gas liberated from the thermal decomposition reaction was found to contain 815 p.p.m. of ethylene, the balance being gaseous hydrogen. In the process of 0.58 gram of aluminum was formed and thus the amount of ethylene liberated during the thermal decomposition reaction corresponded to 0.12 percent based on the weight of aluminum formed. Analysis of the aluminum product for aluminum carbide showed that it had a purity comparable to that produced in Example XI.

It will be seen from the results of Examples XI and XII that the process of this invention is capable of producing exceedingly pure aluminum even when utilizing relatively high thermal decomposition temperatures. It will also be seen that the thermal decomposition time (i.e., residence time) can be kept quite short especially at the more elevated temperatures.

In order to illustrate the preferred unitary (i.e., multistage) operations provided by this invention the following illustrative examples are presented.

EXAMPLE XIII

In this operation a typical aluminum-silicon alloy was used to produce a reaction system composed of diethylaluminum hydride and triethylaluminum hydride and triethylaluminum. In this hydroalumination reaction tertiary amine was present throughout. More particularly, in a 300-milliliter Magne-Stir autoclave were placed 100 ml. of triethylaluminum, 10 ml. of N,N,N',N'-tetramethylethylene diamine, 0.2 gram of sodium, and 10 grams of powdered alloy (below 325 mesh) containing 68 weight percent aluminum, 27 weight percent silicon, 3 weight percent iron, and 2 weight percent titanium. The bomb was closed and stirring was started. The contents of the bomb were heated to 110° C. under a hydrogen atmosphere at 2000 p.s.i. Reaction occurred immediately. After one hour of continuous heating and stirring the autoclave was cooled to room temperature and the hydrogen gas vented. The contents of the bomb were filtered to remove the residual silicon, iron, titanium and unreacted aluminum. This solid residue was washed with benzene and vacuum dried. X-ray analysis of this metallic residue showed 77 percent silicon, 8 percent aluminum and 15 percent others (iron and titanium intermetallics). This corresponds to approximately 95 percent utilization of the free aluminum present in the initial alloy.

25 milliliters of the liquid reaction product was added to a 100-milliliter round bottom one-flask and immersed in an oil bath at 160° C. Upon introduction of 0.02 ml. of titanium tetraisopropoxide, formation of metallic aluminum and evolution of gaseous hydrogen commenced. After approximately 5 minutes the thermal decomposition reaction was essentially complete. The aluminum produced in this second stage was of high purity and the gaseous effluent was substantially entirely gaseous hydrogen.

EXAMPLE XIV

The hydroalumination procedure of Example XIII was repeated except that 0.01 ml. of titanium tetraisopropoxide was added to the hydroalumination reactants. On reaching reaction temperature (110° C.) the reaction commenced immediately and was allowed to proceed for one hour. The residual solids were filtered off, washed with benzene and dried yielding a total of 4.57 grams. On analysis, this residue was found to contain 74 percent silicon, 13 percent aluminum, 13 percent others, corresponding approximately to a 92 percent utilization of the free aluminum of the initial alloy.

25 milliliters of the liquid reaction product was heated to 140° C. in an oil bath for a period of approximately 30 minutes. During this time aluminum slowly precipitated and gaseous hydrogen was evolved.

Another 25 ml. portion of this same liquid reaction product was subjected to the thermal decomposition reaction except that in this instance 0.02 ml. of titanium tetraisopropoxide was utilized as the thermal dissociation catalyst. It was found that at 160 C. metallic aluminum and gaseous hydrogen were evolved at a rapid rate—the reaction was substantially complete within 5 to 10 minutes.

In both cases the metallic aluminum product was of high purity. Likewise in both instances the gaseous effluent from the thermal decomposition reaction was substantially entirely gaseous hydrogen.

The thermal decomposition runs of Example XIV illustrate the fact that under some conditions it is not necessary to introduce into the thermal decomposition system a preformed thermal dissociation catalyst. More particularly, it definitely appears that residual quantities of metallic impurities initially present in the above-described aluminum-silicon alloy formed an active dissociation catalyst in situ. However, a comparison of the respective thermal decomposition results of Example XIV serves to show that it is preferable to utilize a preformed dissociation catalyst inasmuch as it significantly accelerates the desired reaction. A further illustration of this in situ catalyst formation is presented in Example XV.

EXAMPLE XV

The hydroalumination procedure as described in Example XIII above was applied utilizing 14 grams of the above aluminum-silicon alloy, 0.5 gram of sodium, 87 ml. of triethylaluminum, and 15 ml. of tributyl amine. This mixture was heated to 110° C. under an atmosphere of 1000 p.s.i. hydrogen for two hours. Thereupon the reaction mixture was cooled to room temperature and the solids filtered off. After separation of these solids approximately 100 ml. of alkylaluminum hydride-containing product remained.

A 25 ml. aliquot of this reaction solution was mixed with 25 ml. of tributyl amine and heated to 140° C. for about 15 minutes. During this time hydrogen evolved and aluminum metal precipitated. Upon cooling and filtering, the amount of aluminum metal produced was found to be 0.15 gram. A sample of this aluminum was subjected to emission spectrographic analysis and was found to contain a maximum of 0.1 percent silicon and a maximum of 0.02 percent of iron. Titanium was not detected and the remainder was aluminum. This within the limits of the accuracy of the analytical procedure used, the aluminum produced in this process was found to be at least 99.8 percent pure.

The balance of the above liquid reaction product was allowed to stand at room temperature for approximately one week at which time it was noted that metallic aluminum had precipitated. This serves to illustrate the fact that reaction systems of this invention are capable of producing metallic aluminum even at room temperature if sufficient time is provided.

As shown by Example XVI below a feature of this invention is that even though relatively large quantities of the thermal dissociation catalysts are used, very little of the catalyst residue tends to remain as an impurity in the metallic aluminum produced.

EXAMPLE XVI

In a 100-milliliter round bottom one-neck flask were placed 25 ml. of an essentially equimolar mixture of diethylaluminum hydride and triethylaluminum, 25 ml. of tributyl amine and 0.02 ml. of titanium tetraisopropoxide. The flask was partially immersed in an oil bath whereby the reaction mixture was brought to a constant temperature of 140° C. After allowing the reaction to proceed for approximately 5–10 minutes, the flask was withdrawn from the oil bath and the aluminum recovered by filtration. After washing the aluminum with toluene and drying under a slight vacuum, the aluminum was subjected to emission spectrographic analysis in order to determine the content of impurities. The analysis showed that the aluminum contained no more than about 0.02 weight percent of titanium and other metallic impurities. Thus of the total available titanium present in the reaction mixture, less than about $\frac{1}{20}$ became associated with the aluminum produced.

When conducting the hydroalumination reaction for converting the crude aluminum into an alkyaluminum hydride-containing product for use in the thermal dissociation reaction, it is desirable though not essential, to employ a relatively small amount of sodium, sodium hydride or like material to enhance the reactivity of the system. Further details concerning such procedures may be found, for example, in U.S. 3,050,541.

What is claimed is:

1. A process for producing aluminum which comprises subjecting a system formed from alkylaluminum hydride, tertiary amine, and a dissociation catalyst to a temperature sufficiently high and for a period of time sufficiently long to cause formation of aluminum and hydrogen but insufficient to cause on appreciable amount of hydrocarbon to be liberated.

2. The process of claim 1 wherein said system also includes trialkylaluminum.

3. The process of claim 1 wherein said system is an essentially liquid phase system.

4. The process of claim 1 wherein said system is an essentially liquid phase system, said hydride is a dialkyl aluminum hydride, and said system includes trialkylaluminum corresponding to the dialkylaluminum hydride being utilized.

5. The process of claim 1 wherein said system is an essentially liquid phase system formed from dialkylaluminum hydride and its corresponding trialkylaluminum in which the alkyl groups each contain from 2 to about 8 carbon atoms; a tertiary amine selected from the group consisting of tri lower alkyl amines, N,N-dimethyl aniline, pyridine, and N,N,N',N'-tetramethylethylene diamine; and a dissociation catalyst selected from the group consisting of titanium tetrachloride, titanium tetraalkoxides, and vanadium tetrachloride.

6. The process of claim 5 wherein the dialkylaluminum hydride is diethylaluminum hydride and the trialkylaluminum is triethylaluminum.

7. A process for producing aluminum which comprises heating a system formed from alkylaluminum hydride, tertiary amine, and a small quantity of a thermal dissociation catalyst to a temperature within a range of from about 80 to about 260° C. with the proviso that said temperature is high enough and the heat is applied long enough to cause formation of aluminum and hydrogen without causing an appreciable amount of hydrocarbon to be liberated.

8. The process of claim 7 wherein said system also includes trialkylaluminum.

9. The process of claim 7 wherein said system is an essentially liquid phase system.

10. The process of claim 7 wherein said system is an essentially liquid phase system, said hydride is a dialkyl aluminum hydride, and said system includes trialkylaluminum corresponding to the dialkylaluminum hydride being utilized.

11. The process of claim 7 wherein said system is an essentially liquid phase system formed from dialkylaluminum hydride and its corresponding trialkylaluminum in which the alkyl groups each contain from 2 to about 8 carbon atoms; a tertiary amine selected from the group consisting of tri lower alkyl amines, N,N-dimethyl aniline, pyridine, and N,N,N',N'-tetramethylethylene diamine; and a dissociation catalyst selected from the group consisting of titanium tetrachloride, titanium tetraalkoxides, and vanadium tetrachloride.

12. The process of claim 11 wherein the dialkylaluminum hydride is diethylaluminum hydride and the trialkylaluminum is triethylaluminum.

13. A process for producing aluminum which comprises:
(a) converting crude metallic aluminum into a dialkylaluminum hydride-containing liquid phase and a residual solids phase;
(b) effecting separation between said phases;
(c) subjecting the separated liquid phase together with tertiary amine and a small amount of a thermal dissociation catalyst to a temperature sufficiently high and for a period of time sufficiently long to cause the formation of aluminum and hydrogen but insufficient to cause the liberation of an appreciable amount of hydrocarbon; and
(d) recovering aluminum formed in (c).

14. The process of claim 13 wherein said liquid phase includes trialkylaluminum and said crude metallic aluminum is an aluminum alloy.

15. The process of claim 13 wherein said crude metallic aluminum is an aluminum-silicon alloy.

16. A process for producing aluminum which comprises:
(a) forming in a reaction zone a dialkylaluminum hydride-containing liquid reaction product from crude metallic aluminum, trialkylaluminum, hydrogen and tertiary amine, said aluminum intially being associated with one or more solid impurities;
(b) effecting separation between the resulting solids and the liquid reaction product;
(c) heating the liquid reaction product and a small amount of a thermal dissociation catalyst in a heating zone to a temperature high enough and for a period of time long enough for aluminum and hydrogen to be formed without liberating appreciable free hydrocarbon whereby trialkylaluminum and tertiary amine exist in the heating zone;
(d) recovering aluminum formed in (c); and
(e) supplying trialkylaluminum, hydrogen and tertiary amine recovered from the hetating zone to the reaction zone for producing more of the liquid reaction product by interaction with additional crude metallic aluminum.

17. The process of claim 16 further characterized in that it is conducted on a continuous basis.

18. The process of claim 16 further characterized in that:
(1) it is conducted on a continuous basis;
(2) said crude metallic aluminum is a subdivided aluminum-silicon alloy;
(3) said trialkylaluminum is triethylaluminum;
(4) said temperature is in the range of from about 110 to about 140° C.; and
(5) said temperature is maintained in said range at least in part by feeding preheated triethylaluminum into the heating zone.

19. The process of claim 16 further characterized in that said temperature is from about 160° C. to about 220° C.

20. The process of claim 16 further characterized in that:
(1) said trialkylaluminum is triethylaluminum;
(2) said tertiary amine is selected from the group consisting of:
(a) amines having the formula $R_3N$ wherein the R groups are the same or different, and are alkyl, cycloalkyl, aryl, or aralkyl groups;
(b) heterocyclic mononuclear tertiary mono amines; and
(c) amines having the formula

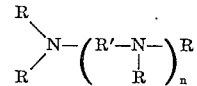

wherein the R groups can be the same or different and are alkyl, cycloalkyl, aryl, or araalkyl groups; and R' is an alkylene or arylene group and $n$ is an integer from 1 to 6; and
(3) said catalyst is a compound represented by the formula MX— wherein the X groups can be the same or different and are chlorine, bromine, iodine or alkoxy, and M is titanium, zirconium, hafnium or vanadium.

References Cited
UNITED STATES PATENTS

| | | | |
|---|---|---|---|
| 3,268,569 | 8/1966 | Mulder et al. | 260—448 |
| 3,273,996 | 9/1966 | Ikeda et al. | 75—.5 |
| 3,326,955 | 6/1967 | Brendel et al. | 260—448 |

L. DEWAYNE RUTLEDGE, Primary Examiner

W. W. STALLARD, Assistant Examiner

U.S. Cl. X.R.

260—448